Patented July 30, 1940

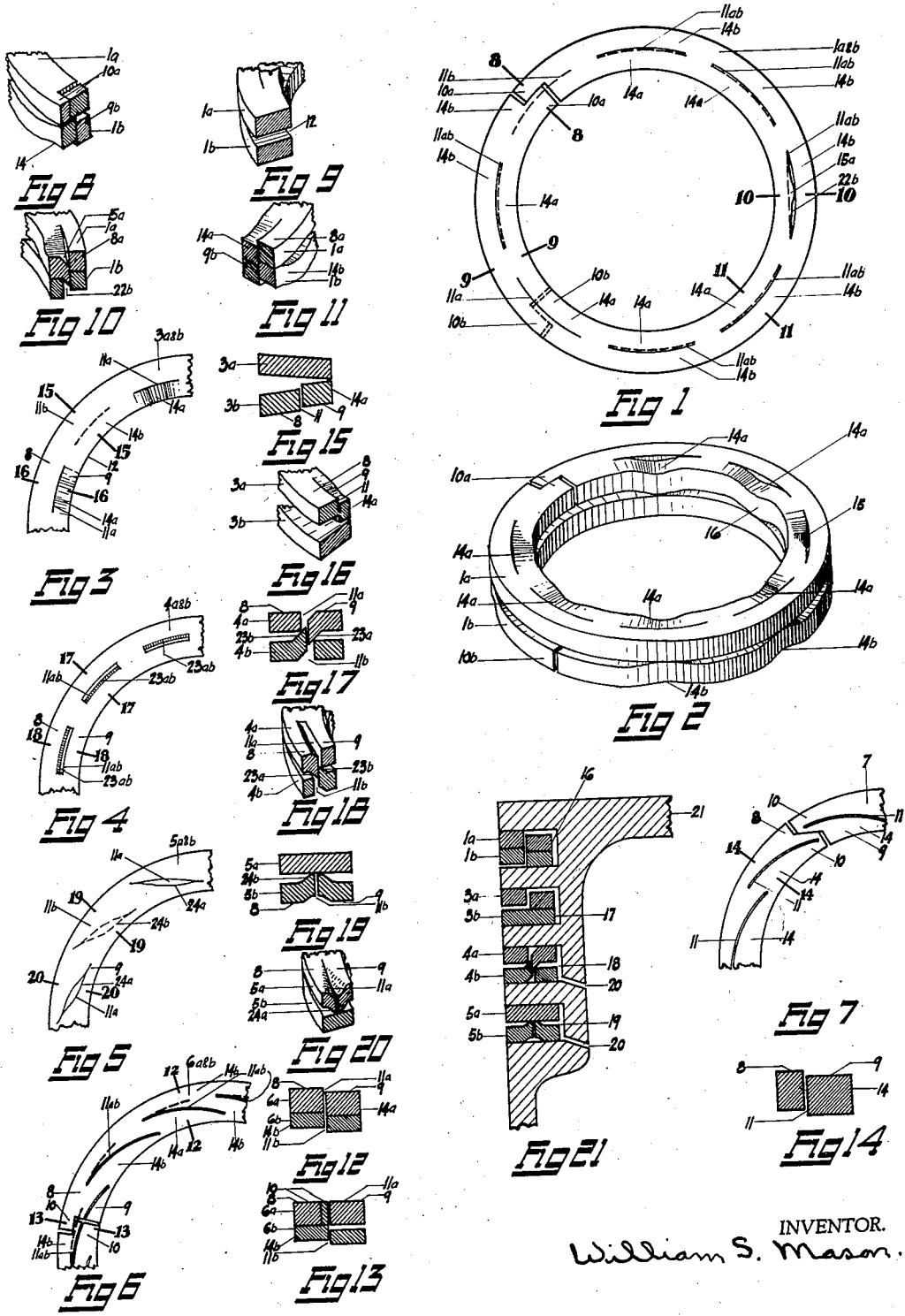

2,209,925

UNITED STATES PATENT OFFICE 2,209,925

PISTON RING

William S. Mason, Ocean Beach, Calif.

Application April 5, 1937, Serial No. 134,953

16 Claims. (Cl. 309—44)

This invention relates to piston rings for use in the cylinders of internal combustion engines, and more especially to packing rings which are axially and radially expansible.

In most internal combustion engines the upper groove in a piston is subjected to higher temperatures than the lower grooves, and therefore has a greater variation in width. For this reason a ring to maintain a substantially uniform pressure on the side walls of the upper groove must have greater axial flexibility than a ring used in a lower groove.

Generally rings are rendered axially compressible by slotting their periphery. Several disadvantages of such a ring, insofar as its use in the upper groove in a piston are; the ring lacks sufficient axial flexibility to maintain a substantially uniform axial pressure on the sides of the groove; the slots decrease the cylinder wall contacting surface of the ring causing it to wear excessively, and reduce the heat path between the ring and the cylinder wall causing the ring to overheat.

The upper groove in a piston generally gets less oil so that it is desirable that an axially expansible packing used in this groove be formed and arranged to collect oil from the cylinder wall to lubricate the sides of the ring and the side walls of the groove to reduce wear; to prevent excessive friction, and to permit freer radial expansion of the ring. One object of the invention is to provide such a packing.

Still further objects are to provide a packing of the class described; which is rendered axially compressible without removing any of the cylinder wall contacting surface of the rings; which can be used in any groove in a piston; which will exert substantially uniform pressure on the cylinder wall and the sides of the groove; which will provide oil scraping and receiving means; which will be durable and have long useful life.

Other objects and advantages of the invention will be brought out in the following description in conjunction with the drawing, and in which like numerals are used to designate like parts.

Figure 1 is a top view, and Figure 2 is a perspective view of a packing comprising two rings;

Figures 3, 4, 5, 6, and 7 are fragmentary developed views of modifications;

Figures 8, 9, 10, and 11 are perspective views on the lines 8—8, 9—9, 10—10, and 11—11 respectively of Figure 1;

Figure 12 is a sectional view on the line 12—12,

Figure 13 is a sectional view on the line 13—13 of Figure 6, Figure 14 is a sectional view on the line 14—14 of Figure 7;

Figure 15 is a sectional view on the line 15—15, and Figure 16 is a perspective view on the line 16—16 of Figure 3;

Figure 17 is a sectional view on the line 17—17, and Figure 18 is a perspective view on the line 18—18 of Figure 4;

Figure 19 is a sectional view on the line 19—19, and Figure 20 is a perspective view on the line 20—20 of Figure 5;

Figure 21 is a fragmentary radial section through a piston having four grooves and a packing in each groove.

Referring to Figure 1 of the drawing, the numeral 1 indicates the packing, the letter $a$ the top ring and the letter $b$ the bottom ring of the packing. The outer margin 8 of the rings extends from one side of slots 11 to the periphery or outer edge of the rings, and the inner margin 9 extends from the opposite side of the slots to the inner edge of the rings. The inner marginal side of each slot of ring $a$ is bent or slightly bowed, and the outer margin of the ring is flat, and in ring $b$ the outer marginal side of each slot is bowed and the inner margin of the ring is flat. These bowed portions of the slots are indicated by the numeral 14. The rings are so arranged that the bowed portions seat on the flat marginal portion of the adjoining ring. This arrangement is shown in Figures 10 and 11, which are perspective views on the lines 10—10 and 11—11 respectively of Figure 1. In addition Figure 10 shows one of the bowed portions of ring $a$ provided with an indentation 15, which is complementary to an enlarged slot 22 in ring $b$. The purpose of the indentation and the enlarged slot is to maintain the annular spaced arrangement of the rings. To minimize leakage at the joint of ring $a$, the rings are so arranged that the annularly extending tongues 10 of ring $a$ will be overlapped laterally by a bowed marginal portion of a slot of ring $b$. This overlapping arrangement is shown in Figure 8, which is a perspective view on the line 8—8 of Figure 1. The purpose of the bowed marginal portions of the slots is to render the rings axially compressible. The width of the packing relative to the width of the groove in which it is used is such that the bowed marginal portions of the rings are only partially compressed, so as to prevent the packing from seizing in the groove, and to provide passageways 12. These passageways, in conjunction with slots 11, which extend laterally from the passageways entirely through the side of the ring, permit oil to reach the lands of the groove and the sides of the rings, so that less ring pressure will be required to seal the groove; the rings will have freer radial expansion; friction and wear will be reduced.

Figure 9 is a perspective view on the line 9—9 of Figure 1, and more clearly shows the spaced arrangement of the rings. An arrangement of the rings 1 within a piston groove is shown in Figure 21, groove 16, of piston 21.

Although one side of each slot of both rings is bowed it will be apparent that substantially the same results may be secured by bowing alternate sides of alternate slots of one ring. In this case one ring would serve as an expander ring and the other ring as a sealing ring. One purpose of the expander ring would be to cause the sealing ring to seat firmly against the adjacent land of the groove, another purpose would be to prevent leakage at the joint of the sealing ring. Figure 6 shows such a packing. Ring $a$ serves as a sealing ring, and ring $b$ as an expander ring. The slots of ring $a$ are staggered and are long enough to overlap radially so as to provide means for more complete lubrication of the adjacent land of the groove and the side of the ring. The inner marginal side of one slot of ring $a$ is bowed and is overlapped annularly by the bowed inner marginal sides of the adjoining slots of ring $b$ so that annular spaced arrangement of the rings will be maintained.

Figure 12 is a section on the line 12—12 of Figure 6, and shows the bowed inner marginal side of the only slot of ring $a$ which has a bowed side.

Figure 13 is a section on the line 13—13 of Figure 6, and shows the method of sealing the joint of ring $a$, which is the same as heretofore described in reference with Figure 1.

Sealing ring $a$ is relatively thicker than ring $b$, and therefore has greater heat conductivity and a larger cylinder wall contacting surface, so will be cooler in operation and be placed adjacent to the upper land of the groove when the packing is used in the upper groove of a piston. When so arranged the expander ring will not be exposed to the direct heat of combustion, so will not overheat. An advantage using a thinner expander ring is that the ring will have greater axial flexibility and maintain a more uniform axial pressure on the lands of the groove.

Referring to Figure 7 the packing consists of a single ring indicated by the numeral 7. Figure 14 is a section of the ring on the line 14—14. Only the inner marginal side of the slots of the ring are bowed to render the ring axially compressible. The outer marginal portion of the ring is flat and seals one side of the groove and the space between the opposite side of the outer marginal portion and the side wall of the groove provides passageways 12. The slots of the ring are staggered so that they may be made longer. By increasing the length of the slots the axial flexibility of the ring is increased and it will exert a more uniform axial pressure on the lands or side walls of the groove.

In Figure 4 alternate sides of each slot of the rings of packing 4 are bowed. The rings are arranged with the bowed sides of the slots of adjoining rings overlapping radially. Because of this overlap the rings have supplementary radial expansion. A medial portion 23 of each bow extends partially into the slot of the adjoining ring and maintains the spaced arrangement of the rings.

Referring to Figure 5: In this modification both sides of the slots of each ring of the packing 5 are bowed. The rings are so arranged that the bowed sides 24 of the slots bear on the adjoining ring, and the annular spacing of the slots is such that the rings have free radial expansion. The slots are staggered and cross the medial portion of the rings so the annular spaced arrangement of the rings is maintained. Because of the relatively small surface contact between the rings, this packing and the modification shown in Figure 4, would preferably be used in the lower grooves of a piston which receive more oil than upper grooves. Their use in such grooves is shown in Figure 21. The bottom of the grooves 18 and 19, of piston 21, are provided with drain ducts 20, which extend through the side of the piston. These drain ducts in conjunction with passageways 12, between the sides of the rings, and which extends radially from the cylinder wall to the bottom of the groove, provide free drainage for excess oil scraped off the cylinder wall by the rings.

The rings of any of the herein described packings may be made by bending flat bands of resilient metal, such as ribbon steel edgewise into ring form. As is well known such rings will be dished slightly by the bending operation and assume substantially such a shape as the rings shown in Figures 15 and 16 which are views on the lines 15—15 and 16—16, respectively, of Figure 3. Because of this dish the rings can be compressed laterally within the groove. The axial flexibility of such rings is dependent upon their thickness. For this reason the rings are made relatively thin and generally four rings are used in a single groove. Another disadvantage of such a packing is that the axial pressure of the packing is exerted mainly on one edge of each of the rings which make contact with the land of the groove.

In the modification shown in Figure 3 the sides of the rings are slotted and the inner marginal portions of adjoining rings are held firmly against the adjoining lands of the groove by the bowed inner marginal sides of the slots. Because of the increased surface contact between the sides of the rings and the groove the axial pressure of the rings will be more uniformly distributed and wear on the sides of the rings and the groove will be reduced. An arrangement of the rings within a piston groove is shown in Figure 21, groove 17, of piston 21.

I claim:

1. For use in a cylinder in combination with a piston provided with a packing ring groove, a packing comprising a pair of superposed resilient metal split rings provided with a plurality of slots, said slots being disposed inwardly of the peripheral and inner edges of the rings, and extending laterally entirely through the sides of the rings to the sides of said packing ring groove.

2. For use in the packing ring groove of a reciprocating piston, a resilient metal split packing ring provided with a plurality of elongated annularly spaced annularly extending slots inwardly of its peripheral and inner edges, said slots opening through both axial faces of the ring and having axially bowed sides, said sides being axially bowed so as to render said ring axially compressible prior to its insertion within said groove.

3. For use in a cylinder in combination with a piston provided with a packing ring groove, an axially elastic packing comprising a plurality of resilient metal split rings, one at least of said rings being provided with a plurality of slots having axially bowed sides, said slots being disposed inwardly of the inner and outer curved sides of the ring and opening through both of its axial faces, said sides being axially bowed prior to insertion of said packing within the groove, and said groove being sufficiently wide that said axially bowed sides of the slots are only partially compressed laterally upon insertion of the packing therein.

4. In combination with a piston having an annular groove therein, an axially elastic packing comprising a pair of resilient metal split rings provided with a plurality of elongated annularly spaced slots inwardly of their peripheral and inner edges, one side of said slots of each of said rings being axially bowed, said axially bowed sides of the slots being formed in a different marginal portion in each of said rings, and the rings being arranged within the groove of the piston with the axially bowed sides of the slots of one ring overlapping those of the adjoining ring in a radial direction.

5. For use in a cylinder in combination with a reciprocating piston provided with a packing ring groove, a resilient metal split ring provided with a plurality of elongated annularly extending slots, said ring being constructed to be axially compressible, and said slots being disposed inwardly of the peripheral and inner edges of the ring, and extending laterally entirely through its sides in an axial direction.

6. For use in the packing ring groove of a reciprocating piston, an axially elastic packing comprising a pair of superposed resilient metal split rings provided with a series of elongated annularly extending annularly spaced slots, said slots being closed at both ends and extending laterally entirely through the sides of the rings in an axial direction, and having one side axially bowed, said rings being arranged within the groove of the piston with the axially bowed sides of the slots of each ring in lateral contact with the side of the adjoining ring.

7. For the purpose described, an axially elastic packing comprising a pair of superposed resilient metal split rings, one of said rings being provided with a series of slots having axially bowed sides, and the adjoining ring having ends overlapping in a radial direction to form a joint, and said joint being arranged complementary to the axially bowed side of a slot of said slotted ring.

8. A packing comprising a plurality of superimposed split rings provided with slots extending entirely through their sides in an axial direction, the side of a slot of one of said rings being indented and arranged complementary to a slot in an adjoining ring.

9. For use in the packing ring groove of a reciprocating piston, a resilient metal split packing ring provided with a multiplicity of annularly spaced slots, said slots being disposed inwardly of the inner and outer curved sides of the ring, and extending laterally entirely through the sides of the ring in an axial direction.

10. A resilient metal split packing ring provided with a series of elongated annularly extending annularly spaced overlapping slots inwardly of its peripheral and inner edges, said slots extending entirely through the sides of the ring in an axial direction, and overlapping in a radial direction at their mutually adjacent ends.

11. The structure of claim 10, in which the inner marginal sides of said slots are axially bowed.

12. For use in a packing ring groove of a reciprocating piston, a resilient metal split packing ring, said ring being constructed to be axially and radially expansible and being provided with a series of slots inwardly of its peripheral and inner edges, said slots extending entirely through the sides of the ring in an axial direction and having axially bowed sides.

13. The structure of claim 12, in which the upper and lower sides of said ring are inclined to its axis.

14. For use in a cylinder in combination with a reciprocating piston provided with a packing ring groove of given width, a resilient metal split packing ring provided with a plurality of slots, said slots being disposed inwardly of the periphery of the ring and opening through both of its axial faces and having sides inclined relative to the radial plane of said ring, and adapted to twist axially upon insertion of the ring within said groove.

15. For use in a cylinder in combination with a reciprocating piston provided with a packing ring groove, a resilient metal split ring, said ring being provided with a series of annularly spaced slots inwardly of its peripheral and inner edges, said slots opening through both axial faces of the ring and having sides formed to be axially compressible.

16. In combination with a reciprocating piston having an annular groove therein, a resilient metal split ring, said ring being provided with a series of elongated annularly spaced slots inwardly of its peripheral and inner edges, said slots being closed at both ends and opening through both axial faces of the ring and having a part of one side intermediate said ends formed to be axially compressible.

WILLIAM S. MASON.